Patented May 8, 1951

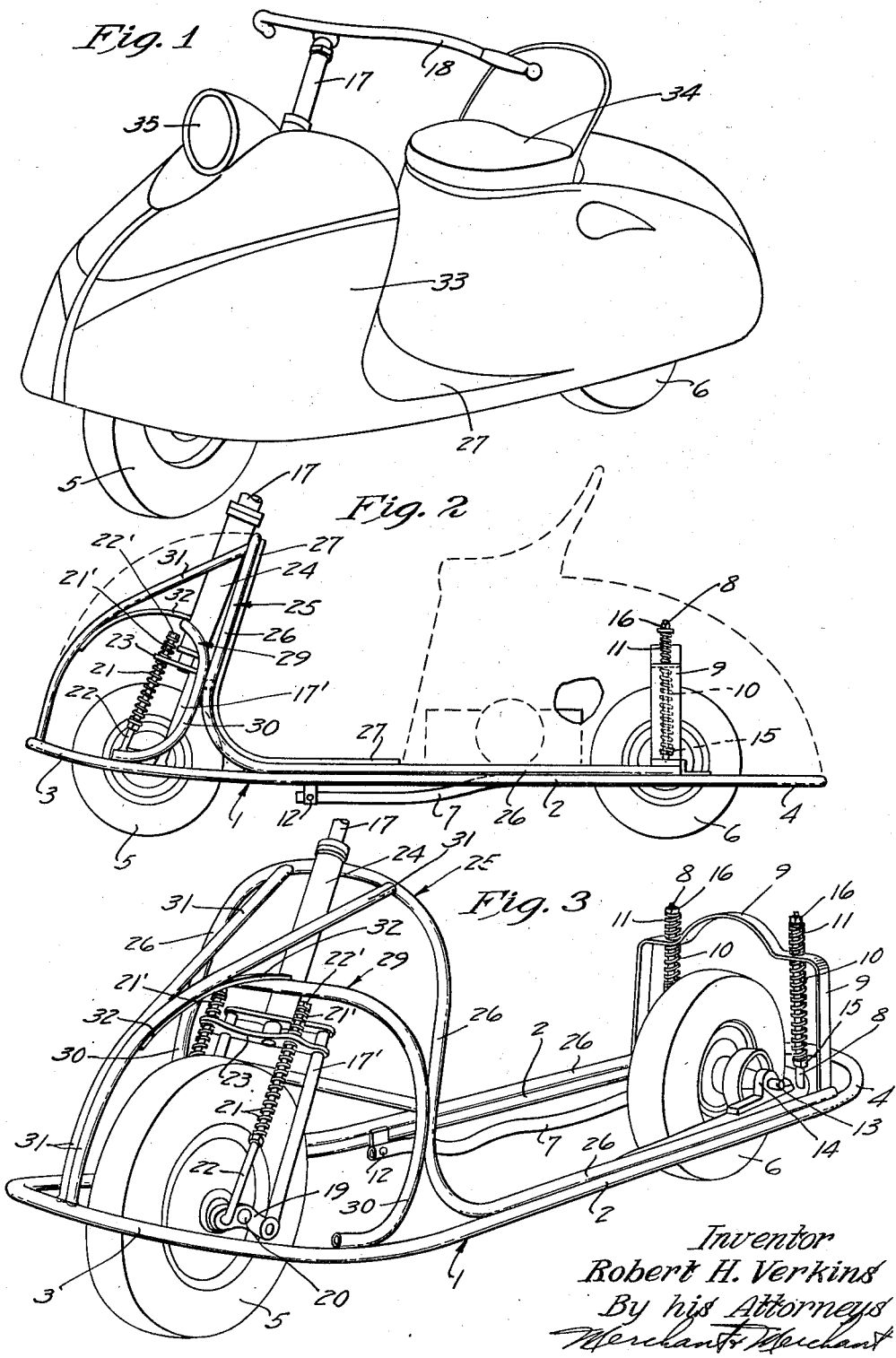

2,551,982

UNITED STATES PATENT OFFICE 2,551,982

VEHICLE FRAME

Robert H. Verkins, Minneapolis, Minn.

Application August 1, 1946, Serial No. 687,796

13 Claims. (Cl. 280—263)

My present invention relates to improvements in vehicles of the class often broadly referred to as cycles, and more particularly the invention relates to improved frame structure for that class of motorcycles commonly referred to as "motor scooters." As is well known, vehicles of this latter class usually involve tandem wheels and a relatively flat platform-type frame; and the front wheels thereof are journalled in head-equipped steering forks, which latter are, in turn, journalled in upwardly-extended bearing sleeves carried by the front ends of their respective platform-type frames.

These fork head bearing sleeves are usually located above the plane of the platform-type frame, and the accepted practice heretofore has been to support and brace these bearing sleeves from the platform-type frame solely by rearwardly-extended framing. This practice of framing the fork head bearing sleeve of such vehicles from the rear is objectionable in that valuable space immediately back of the front wheel is consumed, which could otherwise be used for the operator's feet, and thereby makes it necessary to locate the operator's seat over, or much closer to, the rear wheel than is desirable for riding comfort and weight distribution.

A primary object of the present invention is, therefore, to provide an improved frame structure for cycle-type vehicles of the class described in which the platform-type frame is extended forwardly of the axis of the front wheel, and preferably forwardly of the front wheel, and in which the head of the steering fork is braced and supported from the platform-type frame, mainly by frame structure extended forwardly of the bearing sleeve, thereby making a maximum of space rearwardly of the front wheel available for the operator's feet, or for any other purpose desirable, while obtaining maximum structural rigidity.

In vehicles constructed in accordance with the present invention, it has been possible to provide a much more rigid support for the fork head bearing sleeve without consuming any otherwise valuable space than has been practical in connection with prior art vehicles of this kind, for the following reason, to wit: when bracing from the rear, the fork head bearing sleeve bracing must be extended at a relatively very acute angle to the plane of the axis of the fork head in the interest of space saving; whereas, when the fork head is braced mainly from the front, as in accordance with the present invention, the said bracing can be at a much greater angle to the plane of the fork head axis without using otherwise valuable space rearwardly of the front wheel. In other words, the base of support can be wider when framing the fork head bearing sleeve from the front than would be practical when bracing the fork head bearing sleeve from the rear.

The above and other highly important objects and advantages of the invention will be made apparent from the following specification, claims and appended drawings.

In the accompanying drawings, like characters indicate like parts throughout the several views.

Referring to the drawings:

Fig. 1 is a front perspective view of a complete vehicle incorporating the invention;

Fig. 2 is a view in side elevation of the vehicle of Fig. 1, with the sheet metal body and some other parts broken away or otherwise omitted to show the frame structure forming the subject matter of the invention, the body being shown by dotted lines; and Fig. 3 is a front perspective view of the vehicle frame and front wheel structure, with some parts broken away.

A platform-type main frame of the vehicle illustrated is indicated in its entirety by 1, and in the form illustrated, comprises laterally-spaced substantially-parallel side rails 2 connected at their front and rear end portions by segmental portions 3 and 4, respectively. This frame structure has been broadly referred to as a platform-type frame because it is horizontally disposed and is relatively flat, and to distinguish from vertically-disposed frames, and also because parts of this frame are covered to provide a true platform in the finished vehicle.

The platform-type frame 1 is supported by tandem front and rear wheels, indicated by 5 and 6, respectively, that work through the frame 1 and are centrally disposed between the opposite frame rails 2. Insofar as the present invention is concerned, the rear wheel 6 may be operatively connected to the main frame 1 in any suitable manner. The rear end of the frame 1 may be operatively supported from the wheel 6 in any suitable manner; but in accordance with the present example, this is accomplished by an indirect spring mounting comprising a sub-frame 7 working within the main frame 1, guide rods 8, a cooperating bridge member 9, load-bearing springs 10 and shock absorber rebound cushioning springs 11. The sub-frame 7 is pivoted to opposite main frame rails 2 at 12, and the rear wheel 6 is mounted on an axle 13 that is journalled in suitable bearings 14 carried by the opposite laterally rear end portions of the sub-frame 7. The bridge member 9 has its lower ends anchored fast to the rear end portions of opposite rails 2 of main frame 1, and guide rods 8 are anchored at their lower ends to opposite sides of sub-frame 7 and work slidably through the upper portions of bridge member 9. The load-bearing springs 10 are mounted on the said rods 8 and are compressed between the upper portion of bridge member 9 and shoulders 15 on said rods; and the springs 11 are mounted on the upper ends of said rods 8 and are compressed between nuts 16 thereon and the upper surface of bridge member 9. The propelling engine, which is shown only more or less diagrammatically in Fig. 2, may be assumed to be mounted on the intermediate portion of the sub-frame 7 and to be operatively coupled to the rear wheel through a drive chain or the like (not shown); but this again is not important insofar as the instant invention is concerned.

The front wheel 5 is mounted on and between opposite tines of a bifurcated steering post, sometimes referred to herein as "steering fork," having an upwardly directed head or shaft 17 equipped with handle bars 18. The steering post or fork is of a type commonly employed in the cycle art and includes levers 19 pivoted one to each of fork tines 17' and having the front wheel axle 20 journalled between opposite of said levers. The front ends of the levers 19 are yieldingly supported by load-bearing springs 21 mounted on rods 22, which rods are pivoted one to the front end of each lever 19, and have their upper ends slidably mounted in a guide flange 23 of the steering fork. Shock absorber rebound cushioning springs 21' work on the guide rods 22 between their extreme upper ends and the guide flange 23 and are secured by nuts 22'.

The upwardly-extended head or shaft 17 of the steering post or fork is journalled for steering action in a frame-supported post head bearing sleeve 24, and, as indicated in the introduction thereof, the present invention has to do mainly with the manner of supporting this fork head or post head bearing sleeve 24 from the platform-type frame 1. In accordance with the preferred embodiment of the invention illustrated, the upper end portion of this bearing sleeve 24 is rigidly anchored, by welding or the like, to the intermediate upper portion of an inverted U-shaped brace member 25, the downwardly-extended opposite legs or arms 26 of which extend substantially parallel to the bearing sleeve 24 throughout the length of the latter. Below the plane of the bottom of said bearing sleeve, the brace arms 26 of members 25 are turned backwardly to provide clearance for the front or steering wheel 5 and are joined to opposite frame rails 2, preferably at their points of tangency therewith, by welding or the like. In fact, in the preferred arrangement illustrated, the opposite legs 26 of the member 25 are extended backwardly along opposite frame rails 2 to reinforce the intermediate portion of the platform-type frame, and are rigidly anchored thereto, continuously or at intervals, by welding, brazing or the like. By reference particularly to Fig. 2, it will be seen that the space between opposite legs 26 of the member 25 is spanned by a panel 27 to provide a forwardly-upturned floor and an upwardly-directed instrument panel or dashboard. By reference particularly to Fig. 2. it will be seen that the panel 27 works very close to the front or steering wheel 5 so as to provide a maximum of usable foot space immediately rearwardly of said wheel. Also, in accordance with the present illustration, the lower portion of the bearing sleeve 24 is primarily connected to the platform frame 1 by an inverted U-shaped brace element 29, the intermediate upper portion of which is anchored fast to the lower portion of said bearing sleeve by welding, brazing or the like, and the lower ends of opposite legs 30, of which are welded or otherwise secured to opposite rails 2 of frame 1. In accordance with the present example, and preferably, the said opposite legs 30 of element 29 are first directed downwardly and rearwardly to engage opposite legs 26 of member 25 at their intermediate portions, and are then directed forwardly to points of engagement with frame rails 2 to provide a sort of bridge bracing. In this example, the intermediate portions of the legs 30 are made fast by welding or the like to the engaged opposite legs 26.

The main bracing of the bearing sleeve 24 against pressures exerted longitudinally of the vehicle is accomplished by framing extending forwardly of said bearing sleeve and comprising a pair of brace elements 31 and a brace element 32. The brace elements 31 are welded or otherwise rigidly secured at their upper ends to the upper portion of frame member 25 at points equally laterally spaced from the bearing sleeve 24, and extend forwardly and downwardly therefrom in converging relation, and are brought together adjacent their lower ends and rigidly anchored to the extreme front end of frame 1. Brace element 32 is welded or otherwise rigidly anchored to the lower end portion of the bearing sleeve 24 at its upper end and extends forwardly and downwardly toward the front end portion of frame 1 where it is made fast to the intermediate portions of brace elements 31. This brace framing of the post head bearing sleeve 24 from the front by elements 31 and 32, or their equivalents, provide, as heretofore indicated, a very rigid structure without sacrificing any of the useful space rearwardly of the front wheel for the purpose of supporting or bracing the post head bearing sleeve.

In Fig. 1, the frame structure described is shown as being covered to provide what may be referred to generally as a body 33 incorporating an operator's seat 34 and a suitable head lamp 35.

What I claim is:

1. In a vehicle of the class described, an elongated generally horizontally-disposed platform type frame structure, a generally upwardly and downwardly-extending steering post bearing sleeve located above the front end portion of said frame structure and in rearwardly-spaced relation to the extreme front end thereof, a steering post having a head journalled in said bearing sleeve, a ground-engaging rear wheel located adjacent to and supporting the rear end portion of said frame structure, a ground-engaging front wheel mounted on the lower end of said steering post and working through said horizontal frame structure rearwardly of the front end of said frame structure and with clearance for steering action, brace structure rigidly connecting the lower end portion of said steering post bearing sleeve to said horizontal frame structure, and rigid forwardly and downwardly-extending brace structure connecting the upper end portion of the steering post bearing sleeve to said frame structure forwardly of the axis of the front wheel.

2. In a vehicle of the class described, an elongated generally horizontally-disposed platform type frame structure, a generally upwardly and downwardly-extending steering post bearing sleeve located above the front end portion of said frame structure and in rearwardly-spaced relation to the extreme front end thereof, a steering post having a head journalled in said bearing sleeve, a ground-engaging rear wheel located adjacent to and supporting the rear end portion of said frame structure, a ground-engaging front wheel mounted on the lower end of said steering post and working through said horizontal frame structure rearwardly of the front end of said frame structure and with clearance for steering action, brace structure rigidly connecting the lower end portion of said steering post bearing sleeve to said horizontal frame structure, and rigid forwardly and downwardly-extending brace structure connecting the upper end portion of the steering post bearing sleeve to said frame structure forwardly of the front wheel.

3. In a vehicle of the class described, a platform type frame structure involving longitudinally-extending laterally-spaced frame rails rigidly connected adjacent their front ends, a ground-engaging rear wheel supporting the rear end of said frame structure, a generally-upwardly and downwardly-extending bearing sleeve located above the front end portions of the frame structure, a steering post having a head journalled in said bearing sleeve, a ground-engaging front wheel mounted on the lower end of said steering post and located between the spaced frame rails of said frame structure and rearwardly of the front end of said frame structure, and means supporting the post head bearing sleeve from said longitudinally-extended frame rails, said means comprising brace structure connecting the lower portion of the bearing sleeve to opposite of said frame rails and downwardly and forwardly-extending frame structure connecting the upper portion of the bearing sleeve to said frame structure forwardly of the axis of the front wheel.

4. In a vehicle of the class described, a platform type frame structure involving longitudinally-extending laterally-spaced frame rails rigidly connected adjacent their front ends, a ground-engaging rear wheel supporting the rear end of said frame structure, a generally-upwardly and downwardly-extending bearing sleeve located above the front end portions of the frame structure, a steering post having a head journalled in said bearing sleeve, a ground-engaging front wheel mounted on the lower end of said steering post and located between the spaced frame rails of said frame structure and rearwardly of the front end of said frame structure, and means supporting the bearing sleeve from said longitudinally-extended frame rails, said means comprising brace structure connecting the lower portion of the bearing sleeve to opposite of said frame rails and downwardly and forwardly-extending frame structure connecting the upper portion of the bearing sleeve to said frame structure forwardly of the front wheel.

5. In a vehicle of the class described, an elongated generally horizontally-disposed frame structure, a generally-upwardly and downwardly-extending steering post bearing sleeve located above the front end portion of said frame structure and in rearwardly-spaced relation to the extreme front end thereof, a steering post having a head journalled in said bearing sleeve, a ground-engaging rear wheel located adjacent to and supporting the rear end portion of said frame structure, a ground-engaging front wheel mounted on the lower end of said steering post and working through said horizontal frame structure rearwardly of the front end of said frame structure with clearance for steering action, laterally-outwardly and downwardly-extending brace arms extending from the lower portion of the post head bearing sleeve to opposite rails of said frame structure, laterally-outwardly and downwardly-extending brace arms connecting the upper end portion of the steering post bearing sleeve to opposite rails of said frame structure, and brace structure extending from the upper end portions of the last said brace arms forwardly and downwardly to the front end portion of said frame structure.

6. The structure defined in claim 5 in which the last said brace arms are rigidly anchored each to the intermediate portion of an opposite of the first said brace arms.

7. The structure defined in claim 5 in which the last said brace arms are rigidly anchored each to the intermediate portion of an opposite of the first said brace arms, and in which the said lower end portions of the last said brace arms are backwardly turned and extended parallel each to an opposite side of said frame structure to reinforce the intermediate portion thereof.

8. The structure defined in claim 5 in further combination with brace structure extending from the lower portion of said steering post bearing sleeve to the front end portion of said frame structure.

9. In a vehicle of the class described, an elongated generally horizontally-disposed platform type frame structure, a generally-upwardly and downwardly-extending steering post bearing sleeve located above the front end portion of said frame structure and in rearwardly-spaced relation to the extreme front end thereof, a steering post having a head journalled in said bearing sleeve, a ground-engaging rear wheel located adjacent to and supporting the read end portion of said frame structure, a ground-engaging front wheel mounted on the lower end of said steering post and working through said horizontal frame structure rearwardly of the front end of said frame structure with clearance for steering action, laterally-outwardly and downwardly-extending brace arms extending from the lower portion of the post head bearing sleeve to opposite rails of said frame structure, laterally-outwardly and downwardly-extending brace arms connecting the upper end portion of the steering post bearing sleeve to opposite rails of said frame structure, and forwardly and downwardly-extending brace structure connecting the upper and lower portions of said bearing sleeve to the front end portion of said frame structure.

10. In a vehicle of the class described, an elongated generally horizontally-disposed frame structure, a generally-upwardly and downwardly-extending fork head bearing sleeve located above the front end portion of said frame structure and in rearwardly-spaced relation to the extreme front end thereof, a steering post having a head journalled in said bearing sleeve, a ground-engaging rear wheel located adjacent to and supporting the rear end portion of said frame structure, a ground-engaging front wheel mounted on the lower end of said steering post and working through said horizontal frame structure rearwardly of the front end of said frame structure and with clearance for steering action, an inverted U-shaped brace member having its upper intermediate portion anchored fast to the upper end portion of the post head bearing sleeve and the lower ends of its opposite legs anchored to opposite sides of said frame structure, an inverted U-shaped brace member having its upper intermediate portion anchored fast to the lower portion of the bearing sleeve and the lower ends of its opposite legs anchored to opposite sides of said frame structure at points forwardly of the points of anchorage of the opposite legs of the first said inverted U-shaped brace member, the intermediate portion of the legs of the second said inverted U-shaped brace member being anchored fast to the lower intermediate portions of the legs of the first said inverted U-shaped brace member, and forwardly and downwardly-directed brace structure connecting the upper portion of the first said inverted U-shaped brace member to the front end portion of said frame structure.

11. The structure defined in claim 10 in which the last said brace structure further involves a forwardly and downwardly-extending connection between the lower portion of said bearing sleeve and the front end portion of said frame structure.

12. The structure defined in claim 10 in which the lower end portions of the opposite legs of the first named inverted U-shaped brace members are rearwardly curved and are extended along and are made fast to opposite side portions of said frame structure to reinforce the same.

13. In a vehicle of the class described, the combination of: a steering wheel; a steering shaft; a steering post structure rigidly secured to and turning with said steering shaft; an axle for said wheel carried by and for turning movements with said steering post structure; a frame, the front portion of which entirely surrounds said wheel forming a wheel well inside which said wheel can rotate freely and turn freely into any position in which it can be turned with said steering shaft; a steering shaft bearing in which said steering shaft can turn but is restrained from axial movement; a supporting structure enclosing said wheel well and rigidly secured at its lower end to said frame and at its upper end to said steering shaft bearing; and handle-bars rigidly attached to the steering shaft above the supporting structure.

ROBERT H. VERKINS.

REFERENCES CITED

The following references are of record in the file of this patent:

FOREIGN PATENTS

| Number | Country | Date |
|--------|---------|------|
| 192,700 | Great Britain | July 19, 1923 |
| 677,816 | Germany | July 4, 1939 |